INVENTORS
HENNING KARLBY
AMOS B. NEWBURY
BY Strauch, Nolan & Neale
ATTORNEYS

INVENTORS
HENNING KARLBY
AMOS B. NEWBURY

BY Strauch, Nolan & Neale

ATTORNEYS

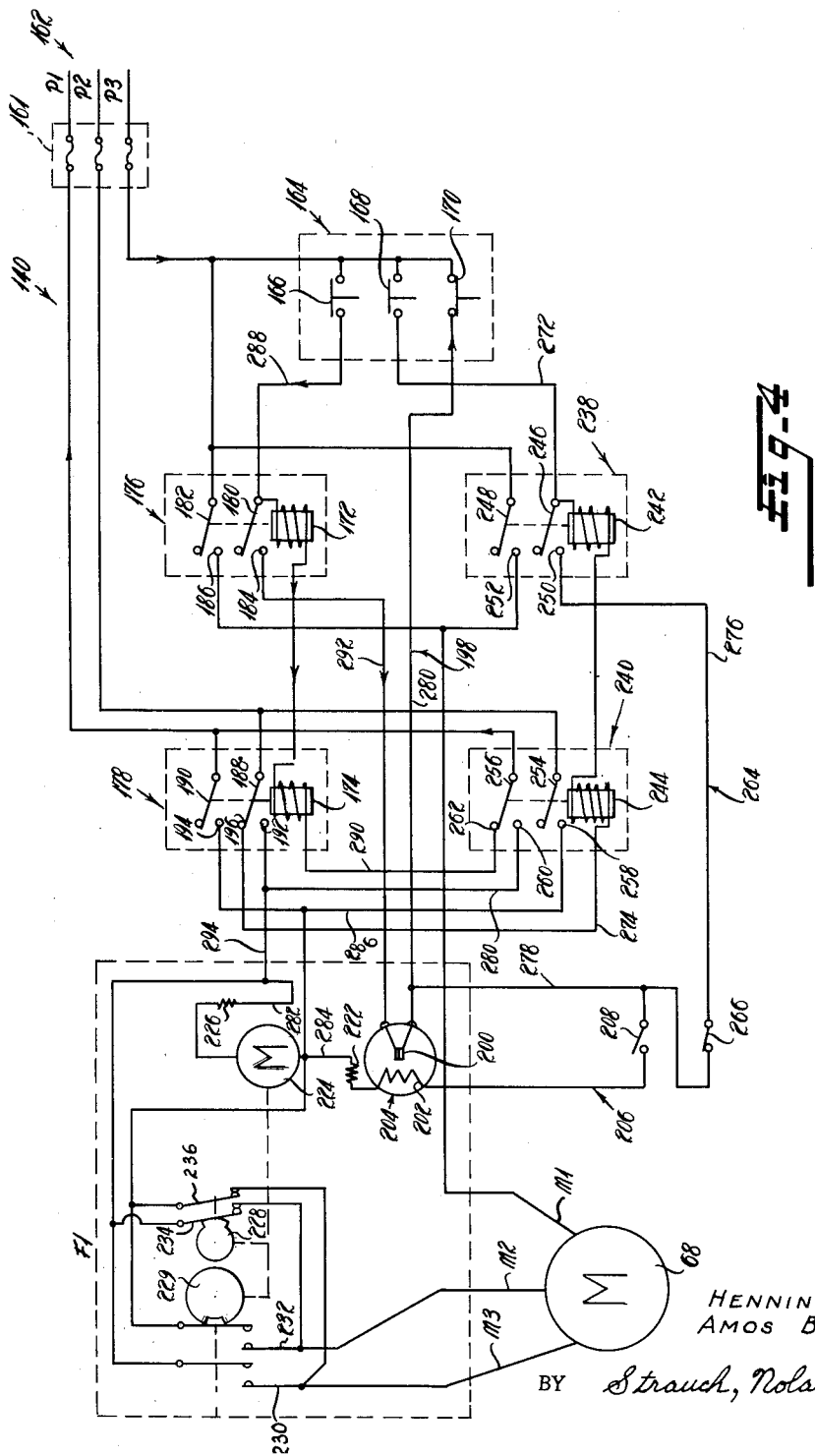

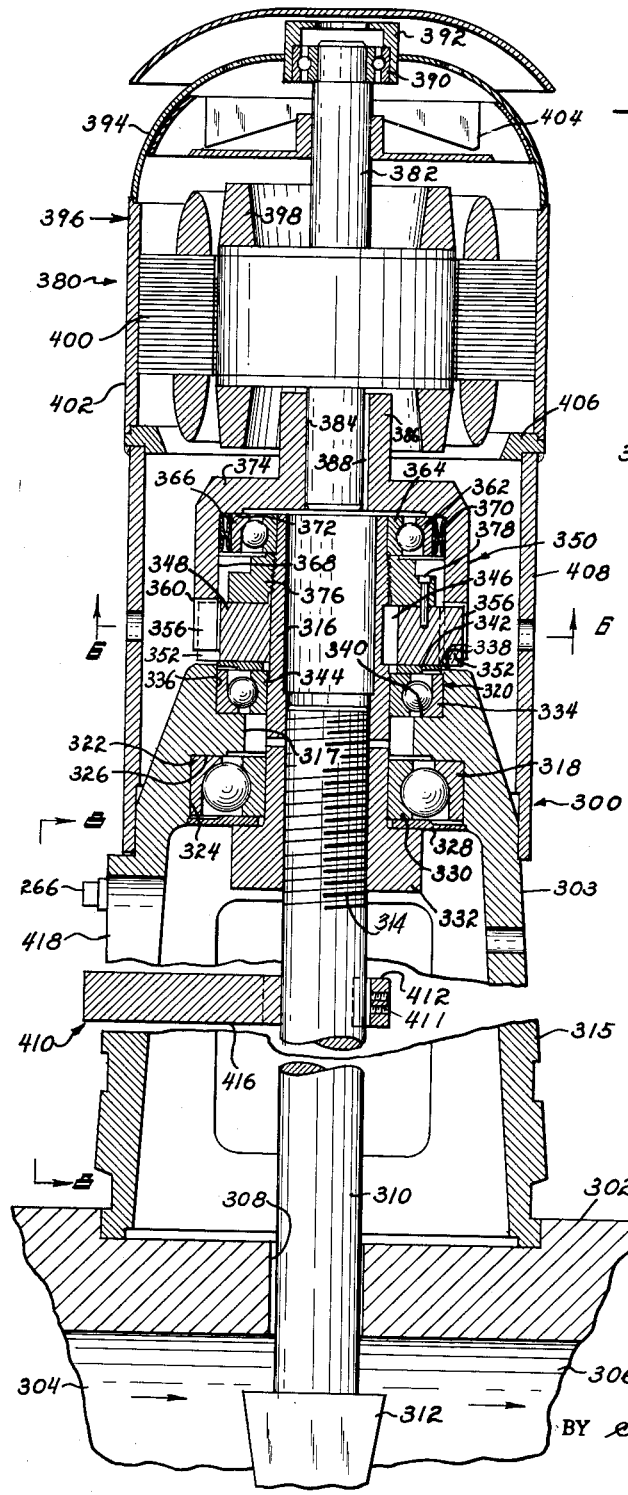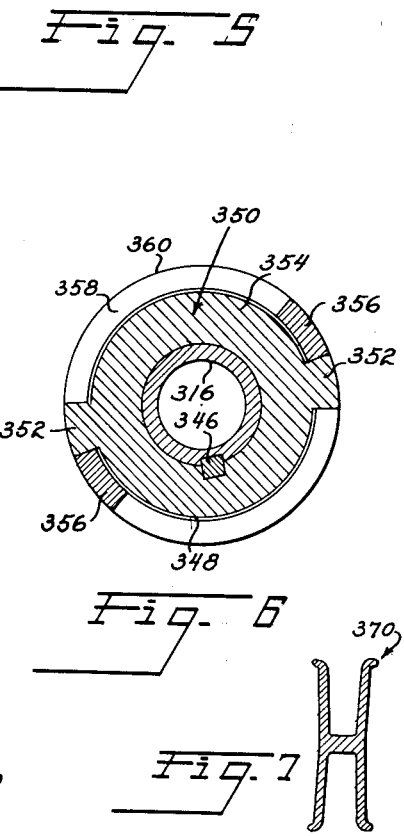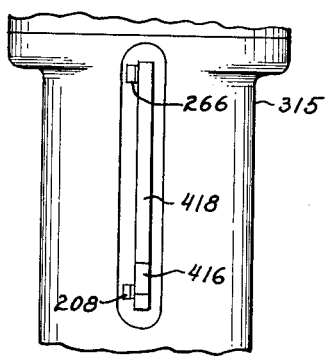
Fig. 5
Fig. 6
Fig. 7
Fig. 8
INVENTORS
HENNING KARLBY
AMOS B. NEWBURY
BY Strauch, Nolan & Neale
ATTORNEYS

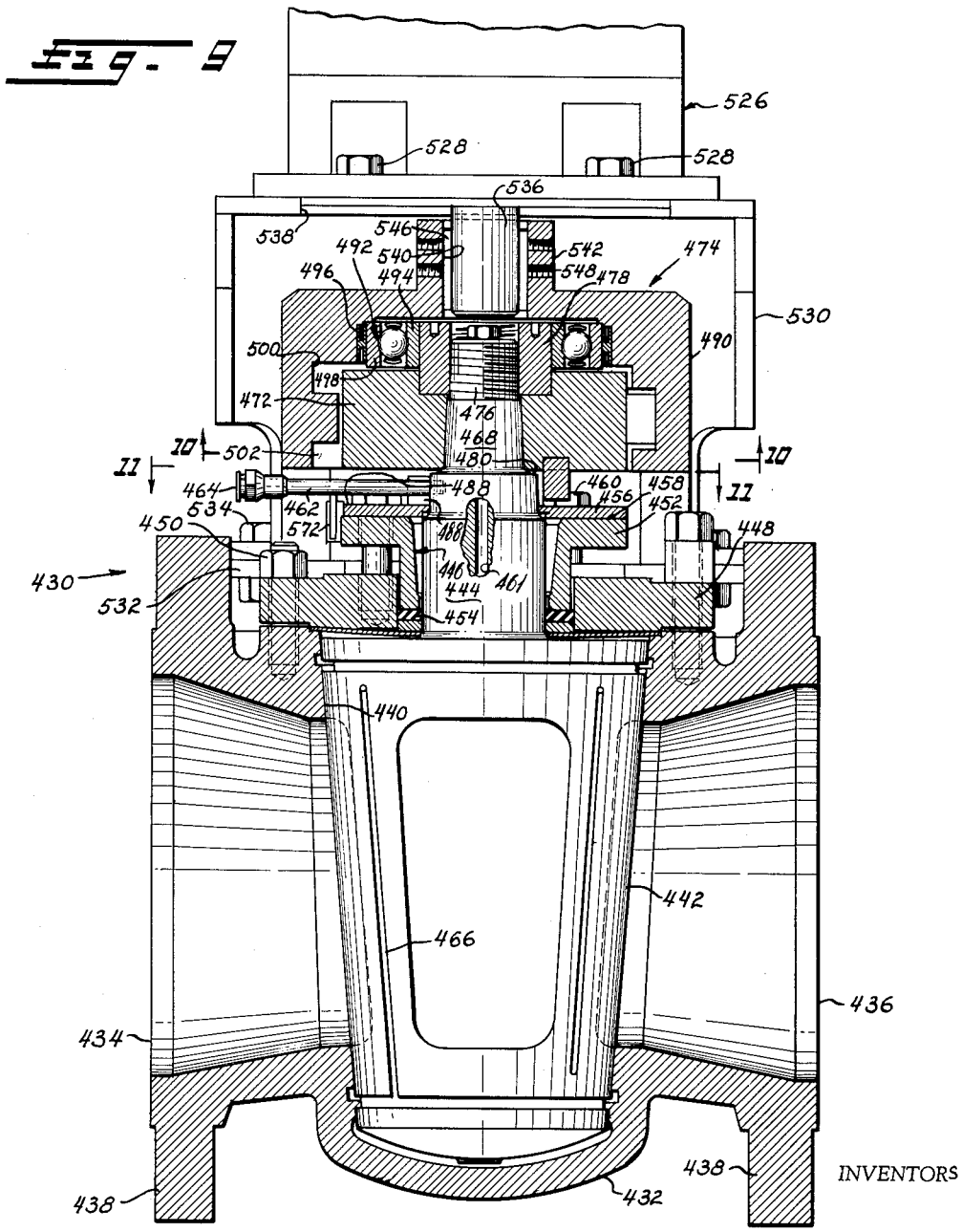

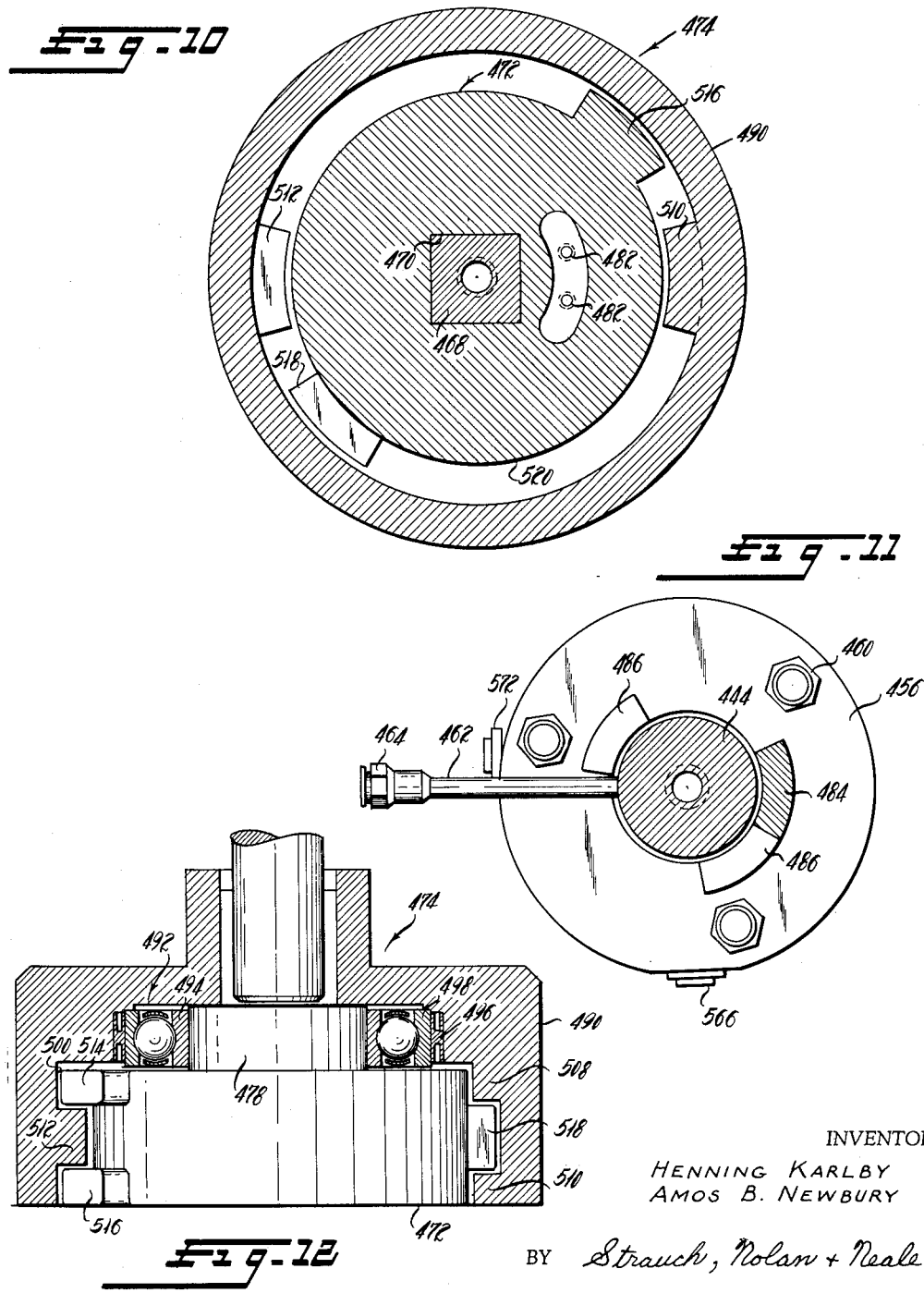

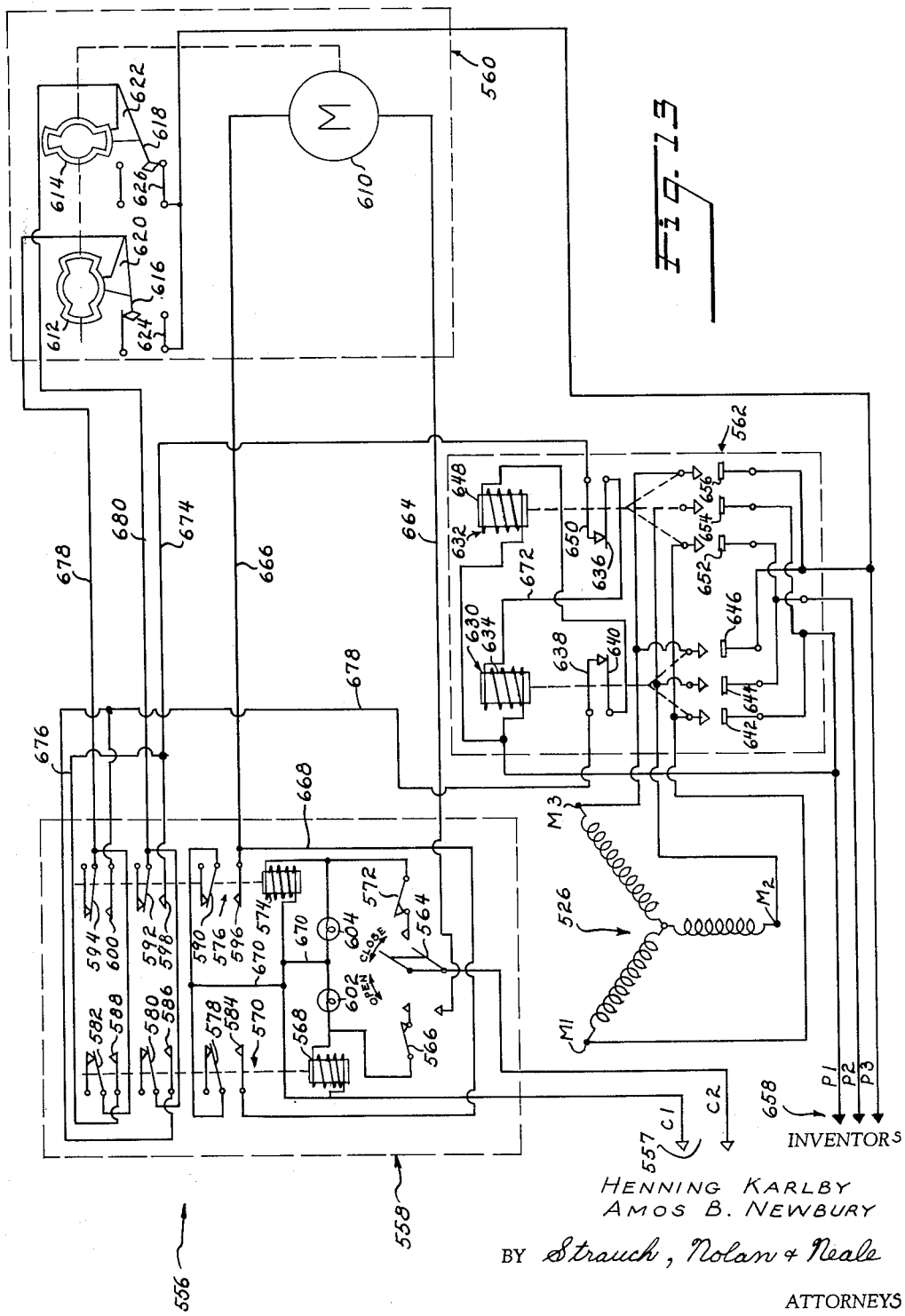
INVENTORS
HENNING KARLBY
AMOS B. NEWBURY
BY Strauch, Nolan & Neale
ATTORNEYS United States Patent Office 2,992,807
Patented July 18, 1961

2,992,807
MOTOR DRIVEN IMPACT VALVE OPERATOR
Henning Karlby, Pittsburgh, and Amos B. Newbury, Washington Township, Pa., assignors to Rockwell Manufacturing Company, Pittsburgh, Pa., a corporation of Pennsylvania
Filed Apr. 15, 1959, Ser. No. 806,639
32 Claims. (Cl. 251—76)

This invention relates to valves and more particularly to improved motor-driven valve operators and controls therefor which move the valve between open and closed positions by impact.

In piping systems, valves often are of such size as to prohibit manual operation thereof. More particularly, the effort required to readily unseat or to firmly seat valves of relatively large size is such that it cannot be effectively accomplished by manual force alone. Consequently, many forms of power and manual operators have been proposed to facilitate the operation of relatively large size valves and particularly to manage effective seating and unseating performance. Power operation of valves is also essential when it is desired to control a valve from a remote location.

The conventional power operators which have been proposed utilize gear trains to build up the torque required to operate the valve at the expense of speed and power supply. The disadvantage of these power gear train operators is that the force delivered to operate the valve is always constant and is always of such magnitude to facilitate the effective seating and unseating of the valve plug or closure member. In the operation of a valve, however, it will be appreciated that the minimum force required for moving the valve plug is not always constant and is greater for seating or unseating the valve plug as compared to the force normally applied in merely positioning the valve plug between its terminal open and closed positions. Consequently, since the constant force applied by the power gear train operators must be at least equivalent to the force required for effectively seating and unseating the valve plug, there is an unavoidable uneconomical supply and wasteful consumption of power during those periods when valve positioning is being accomplished.

The manual operators generally are not characterized by the wasteful consumption of power attributed to the conventional power operators. One type of conventional manual operator that efficiently consumes the power input to operate the valve and which applies substantially the minimum force required to move the valve plug or closure member, is the manually operated impact-type operator. These manual impact operators are customarily provided with heavy fly-wheel type handles which are attached to the valve stem through lost motion couplings to allow a build-up of inertia before the force is applied to the valve stem. The kinetic energy delivered by the operator to the valve stem is efficiently and economically applied as required to provide the necessary force to move the valve in accordance with the well-known impact principle. Since the applied force is always a function of the resistance to motion, there is no uneconomical use of the power supplied and a series of repeated and successive impacts can be applied to drive the valve stem to thereby facilitate and promote tight seating characteristics and to assure effective unseating of the valve.

In view of the above advantages attributed to operating a valve in accordance with the impact principle, power operators were subsequently suggested which attempted to duplicate the impact characteristics embodied in the conventional manually operated impact-type valve operators as described above. These prior power operated devices, however, only caused initial movement of the valve stem in a selected direction by a single hammer blow or impact and did not provide for repeated and successive impacts. Consequently, these prior power operators were deficient in the effective seating and unseating characteristics attributed to the conventional manual impact type valve operators.

In these prior power operators, after the initial impact is imparted to start the valve plug movement in a selected direction, transfer of power to continue movement of the valve plug in the direction selected is accomplished by a positive and steady application of torque similar to the gear train power transmission hereinbefore described. To facilitate continuous running of the driving motor under these conditions, such mechanisms as overrun clutches, ratchets or energy-storing springs are required. Moreover, the initial impact or hammer blow imparted by such a valve operator to start the valve movement towards closed position does not function significantly to firmly position the valve plug or closure member in its seat but merely serves to overcome the inertia of the movable parts. Thus the greater force required to firmly seat the valve plug is still applied by a conventional gear train or suitable mechanism with the resulting uneconomical consumption of power.

Accordingly, the present invention has as its general purpose and primary object the provision of a novel motor driven valve operator which moves the valve stem in a selected direction by a series of automatically delivered repeated and successive impacts. This is accomplished in accordance with the construction of the present invention by providing for a control circuit which automatically reverses the power phases of an electric motor so as to reverse the rotation of the motor armature at predetermined intervals and for a lost motion impact coupling operatively connecting the motor armature to the valve operating stem. The driver of this impact coupling is connected to the motor armature and imparts repeated and successive impacts to the driven member of the impact coupling which is connected to the valve operating stem so as to move the stem in a selected direction entirely by impacts.

With the foregoing purposes and considerations in mind, therefore, it is a further major object of the present invention to provide for a novel electrically controlled motor driven valve operator which moves a valve operating stem in a selected direction entirely by a series of automatically delivered repeated and successive impacts.

A further object of the present invention is to provide for a novel motor driven valve operator having a control circuit which automatically reverses the electric power phases of the motor so as to reverse the direction of rotation of the motor at predetermined intervals to thereby rotate the driver of a lost motion impact coupling connecting the motor to a valve operating stem through a series of forward impact strokes and reverse repositioning strokes for moving the valve operating stem in a selected direction entirely by impact.

Still a further object of the present invention resides in the provision of a motor driven valve operator as in the preceding object wherein the motor continues to operate a predetermined period after the valve plug initially engages its seat in the body of the valve during a closing operation so as to impact the valve plug firmly into its seat.

A further object of the present invention resides in the provision of a novel electrically controlled motor driven operator having an electrical control circuit wherein an electrical interlock is provided to prevent movement of the valve stem in a reverse direction while it is being operated in a selected opposed direction.

A further object of the present invention resides in the provision of a novel motor driven valve operator which rotates and axially shifts a valve operating stem in selected directions by a series of automatically delivered repeated and successive impacts.

Still a further object of the present invention resides in the provision of a novel motor driven valve operator which axially shifts a rotatably restrained valve operating stem in a selected direction by a series of automatically delivered repeated and successive impacts.

A further object of the present invention resides in the provision of a motor driven valve operator as in the preceding object wherein a valve plug position indicator functions to restrain the valve operating stem from rotation.

A further object of the present invention resides in the provision of a novel motor driven valve operator which rotates an axially restrained valve operating stem in a selected direction by a series of automatically delivered repeated and successive impacts.

Still a further object of the present invention resides in the provision of a motor driven valve operator as in the preceding object wherein the operated valve is a plug valve having a lubricant supply tube which actuates limit microswitches for controlling the operation of the motor.

Still a further object of the present invention resides in the provision of a motor driven valve operator as in the preceding object wherein a stop plate is provided to mechanically limit travel of the plug to 90°.

These and other objects will presently become apparent by reference to the appended claims and as the description proceeds in connection with the accompanying drawings, wherein:

FIGURE 4 is a schematic wiring diagram of the control circuit for the motor driven valve operator of FIGURES 1 and 5;

FIGURE 5 is an axial sectional view illustrating a valve and motor driven operator therefor according to another embodiment of the present invention;

FIGURE 6 is a section substantially along the line 6—6 of FIGURE 5;

FIGURE 7 is an enlarged sectional view of the H-shaped spring illustrated in the embodiment of FIGURE 5;

FIGURE 8 is a fragmentary elevation of the motor driven valve operator of FIGURE 5 and taken substantially along line 8—8 of FIGURE 5;

FIGURE 9 is an axial sectional view illustrating a valve and motor driven operator therefor according to a further embodiment of the present invention;

FIGURE 10 is an enlarged section substantially along line 10—10 of FIGURE 9;

FIGURE 11 is an enlarged section substantially along line 11—11 of FIGURE 9;

FIGURE 12 is an enlarged axial sectional view of the passing-detent-type impact coupling illustrated in FIGURE 9; and FIGURE 13 is a schematic wiring diagram of the control circuit for the motor driven valve operator of FIGURE 9.

Figure 1:
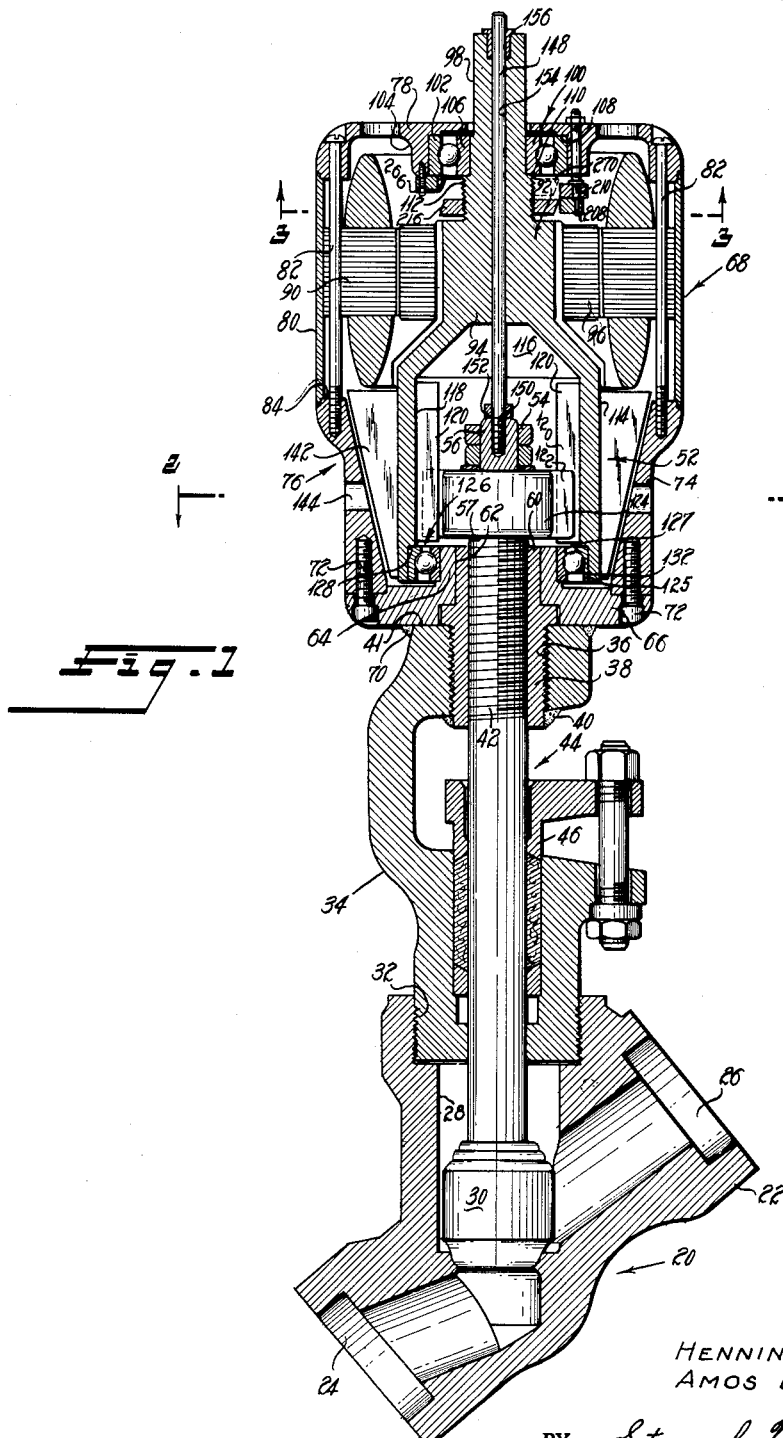
FIGURE 1 is an axial sectional view illustrating a valve and motor driven operator therefor embodying the principles of the present invention.
Figure 2:
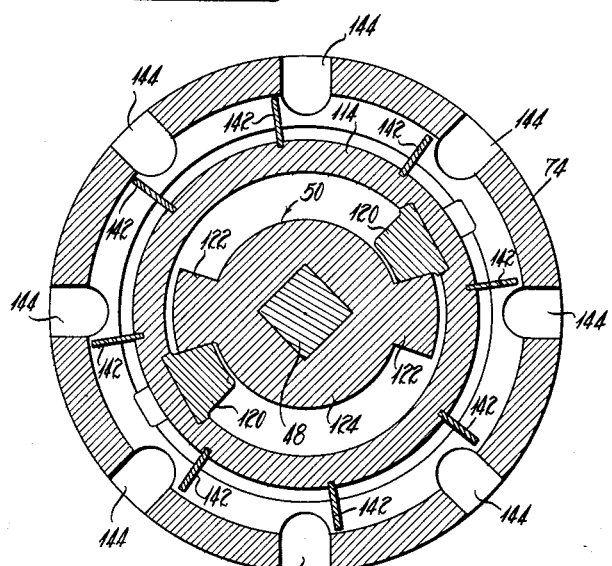
FIGURE 2 is an enlarged section substantially along the line 2—2 of FIGURE 1.

Referring now to the drawings and more particularly to FIGURES 1 and 2 wherein one construction embodying the principles of the present invention is shown, reference numeral 20 generally designates a power operated globe type valve which comprises a valve body 22 of conventional construction having inlet and outlet passages 24 and 26 and cross bore 28 for seating a valve stem plug 30. The valve stem cross bore 28 is internally threaded at 32 to engage the externally end threaded section of valve yoke 34. The upper end of the valve yoke 34 is provided with a vertical through bore 36 aligned with the cross bore 28 and internally threaded to threadedly receive a stem travel bushing 38 which is welded to the yoke at 40 or otherwise suitably secured against movement relative thereto and which projects upwardly beyond the planar end face 41 of the valve yoke. This bushing 38 is internally threaded to engage the externally threaded section 42 of the operating valve stem 44 which coaxially extends through the bushing and a conventional packing gland supported by the yoke 34 and generally indicated at 46.

The valve stem 44 coaxially projects into the cross bore 28 and is rigidly secured to the valve operating stem plug 30 or made integral therewith. By this structure, it will be appreciated that the valve stem 44 is free to move both angularly and axially to thereby facilitate the shifting of the stem plug 30 between its open and closed positions. The portion of valve stem 44 which projects above the bushing 38 is provided with a reduced square shank section 48 (FIGURE 2) which is non-rotatably received in a mating square opening coaxially formed in the driven member 50 of the valve actuating impact coupling 52.

The driven member 50 is restrained against axial movement relative to the stem 44 between lock nuts 54 which threadedly engage the reduced diameter end section 56 of stem 44 projecting above the driven member 50 and a shoulder 57 formed between the stem threaded section 42 and the stem shank portion 48.

The upper portion 60 of bushing 38 projecting above yoke 34 is press-fitted into a bore 62 coaxially formed in an upwardly projecting boss portion 64 of a motor end plate 66 of the valve actuating motor generally indicated at 68. This end plate 66 is coaxially supported on the planar end face 41 of the valve yoke 34 and is secured thereto as by welds 70. Removably secured to the end plate 66 coaxial with stem 44 by machine screws 72 is an upwardly extending cylindrical auxiliary housing section 74 of the motor housing generally indicated at 76. The motor housing 76 is provided with an end bell 78 and an open ended cylindrical main housing section 80 which are mounted on the auxiliary housing section 74 coaxial with stem 44 by elongated bolts 82 which extend through suitable apertures formed in the end bell 78 and are threaded into bores which extend inwardly from the upper planar end face 84 of the auxiliary housing section 74.

The motor 68 is preferably a squirrel cage induction type electric motor as will become apparent as the description proceeds and a ⅛ horsepower 3-phase capacity is normally sufficient to supply adequate power to operate a 2-inch globe valve in accordance with the principles of the present invention. This motor 68 is illustrated to comprise a conventional stator 90 suitably affixed to the main housing section 80 and a rotor 92 having an armature section 94 concentrically spaced in the stator field with the customary soft iron pole pieces 96 affixed thereto. The upper end of the rotor 92 terminates in a reduced diameter shaft section 98 extending upwardly beyond the end bell 78 and journalled in a conventional ball bearing assembly 100. The outer race 102 of the bearing 100 is press-fitted into a downwardly depending socket 104 formed integral with the end bell 78 and coaxial with the stem 44. The inner race 106 of bearing 100 is restrained against axial movement between the shaft section 98 and an externally threaded shaft portion 112.

The lower end of the rotor 92 terminates in an enlarged cup-shaped impact driver 114 which constitutes the driving or actuating member of the impact coupling indicated at 52. This driver 114 is provided with a recess 116 which is formed coaxial with stem 44 and extends downwardly over the driven member 50 in concentric surrounding relationship thereto.

Keyed or otherwise suitably secured to the driver 114 for rotation therewith and extending radially inwardly into the recess 116 from the internal wall 118 thereof are two diametrically opposed abutments or lugs 120. These abutments 120 of the driver 114 are adapted to abuttingly engage two diametrically opposed ears 122 which extend radially outwardly from the hub 124 of the driven member 50 and which are formed integral therewith.

The lower end of the driver is journalled on the outer race 125 of a conventional ball bearing assembly 126, the inner race 127 of which is press-fitted on the upwardly extending boss 64 of motor end plate 66. This ball bearing assembly 126 is confined against axial movement between an annular shoulder 128 formed by the internal wall 118 of the driver 114 and which abuttingly engages the outer race 125 and an annular shoulder 132 formed integral with the end plate 66 at the base of the boss 64 which abuttingly engages the bearing inner race 127.

By this construction, it will be appreciated that the rotor 92 and consequently the driver 114 of the impact coupling 52 is free to rotate in opposed directions. As a result of the spacing between the abutments 120 of the driver 114 and the spacing between the ears 122 of the driven member 50, a substantial momentum is developed due to the mass of the rotor 92 and the speed to which it accelerates to before the abutments 120 engage the ears 122. In accordance with the present construction as hereinbefore described, the rotor 92 is capable of being accelerated in either direction through an arc of substantially 180° before the abutments 120 strike the ears 122 and thereby impart an impact to the driven member so as to rotate the valve operating stem 44 in a selected direction. Thus, by repeated and successive impacts, the operating valve stem 44 and valve plug 30 are axially shifted between open and closed positions.

In order to facilitate the reversal of the motor 68 so as to impart successive and repeated impacts to the driven member 50 to thereby move the valve operating stem 44 in a selected direction, a reversing motor control circuit generally indicated at 140 (FIGURE 4) is provided and will hereinafter be described. The continuous reversing of the motor 68 to impart a series of impacts for driving the operating stem 44 establishes the generation of substantial amounts of heat. Consequently, an electric motor of the squirrel cage construction as hereinbefore described is preferred since this type of motor is characterized by a relatively constant rotor resistance and constant speed characteristics throughout a wide range of temperatures. The squirrel cage construction is further preferred in view of its high torque characteristics over low speed ranges when starting up. Thus, with this type of motor, synchronous speed does not necessarily have to be attained in order to establish a magnitude of torque which is sufficient for operating the valve and the starting torque developed before synchronous speed is reached is sufficient to operate the valve efficiently. In some applications of the present invention, the successive and repeated impacts may be applied by oscillating hydraulic or pneumatic motors.

In order to readily assure the dissipation of heat developed by the continual reversals of the motor 68, vanes indicated at 142 (FIGURES 1 and 2) are provided and are affixed to the driver 114 to extend radially outwardly therefrom in spaced relationship to the auxiliary housing section 74. The auxiliary housing 74 is provided with equiangularly spaced elongated holes 144 (FIGURE 2) through which the heated currents of air are dissipated to the surrounding atmosphere by rotation of the vanes 142 with the rotor 92.

In order to indicate the relative position of the valve plug 30 in the valve body 22, an indicator rod 148 (FIGURE 1) is provided having one end threadedly engaged in a bore 150 extending inwardly from the planar end face 152 of the stem terminal section 56 and coaxial with the stem 44. This indicator rod 148 extends upwardly through an axially formed bore 154 in the rotor 92 and projects beyond the rotor shaft section 98 where it is suitably journalled in a sleeve 156 press-fitted into the end of bore 154. The portion of the rod 148 which visibly protrudes may be suitably marked so as to indicate the position of the valve plug 30.

Referring now to FIGURE 4, the motor control power circuit 140 for operating and reversing the rotation of the motor 68 is connected through a suitable fuse block 161 to a 3-phase, 220 v. supply source indicated at 162 and includes a conventional pushbutton selector control station 164 having a valve-closing pushbutton 166, a valve-opening pushbutton 168, and a stop-pushbutton 170 all connected to the power phase conductor P3. The close-pushbutton 166 is in series circuit relationship with relay windings 172 and 174 of suitable solenoid-type relays 176 and 178 so that depression of pushbutton 166 energizes the windings 172 and 174.

The relay 176 is provided with two mechanically interlocked switch blades 180 and 182 which respectively engage stationary contacts 184 and 186. This relay 176 is shown to be in de-energized condition wherein the movable switch blades 180 and 182 are biased by means not shown, to be out of engagement with their respective contacts 184 and 186. Upon energization of the relay winding 172, the switch blades 180 and 182 respectively move into engagement with the stationary contacts 184 and 186.

Similarly, the relay 178 is shown to be in de-energized condition and includes two movable mechanically interlocked switch blades 188 and 190 operable by the relay winding 174 and biased, by means not shown, to be out of engagement with their respective contacts 192 and 194. In this de-energized condition, switch blade 188 engages a stationary contact 196 and upon energization of the relay winding 174 the blade 188 disengages contact 196 and engages contact 192 while blade 190 interlocked with blade 188 is moved to engage contact 194.

Engagement of switch blade 182 with contact 186 connects terminal M1 with power phase conductor P3. Engagement of switch blade 180 with contact 184 establishes a holding circuit 198 to permit the release of the close-pushbutton 166 without interruption of the operation of motor 68. This holding circuit 198 includes in series circuit relationship the stop-pushbutton 170 of the pushbutton station 164 and a pair of movable normally closed time delay contacts indicated at 200 which are actuated by the resistance heater element 202 of a time delay relay 204 in the heater circuit indicated at 206.

The heater circuit 206 containing the resistance heater 202 of time delay relay 204 is connected to the power conductor P1 by switch blade 190 when actuated by energization of relay 178 to engage contact 194 and by a suitable microswitch 208 in series with the resistance heater 202 and contact 194.

Figure 3:
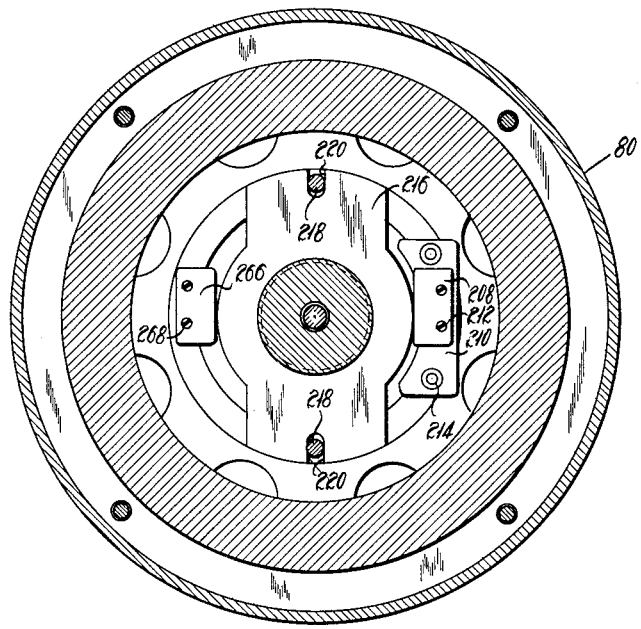
FIGURE 3 is an enlarged section substantially along the line 3—3 of FIGURE 1.

Referring now to FIGURES 1, 3 and 4, microswitch 208 is affixed to a spacer plate 210 by bolts 212. The spacer plate is secured by bolt and nut assemblies indicated at 214 to the end bell 78 in predetermined radial spaced relation to the rotor threaded section 112. In order to actuate the microswitch 208 when the valve plug 30 reaches its closed or seated position in the valve body 22, a nut 216 is threaded over the left-hand threads of the rotor threaded section 112 so that it is free for axial movement relative to the rotor 92. A pair of equiangularly spaced pins 218 project downwardly from the end bell 78 and extend through radially extending slots 220 formed in the nut 216 to thereby restrain the nut from rotation when the rotor 92 is turned.

By this structure, it will be appreciaated that the travel nut 216 is restrained from rotation but is free for axial movement when rotor 92 is rotated. In assembled relationship the nut 216 engages the microswitch 208 to close the switch contacts thereof when the valve plug 30 reaches its seated position. This completes the heater circuit 206 to facilitate passage of current through the heater element 202 of time delay relay 204. This relay 204 is set to open its contacts 200 so as to interrupt the holding circuit 206 a selected time following the seating of valve plug 30. This facilitates the continuation of operation of the motor 68 for a predetermined period after the valve plug 30 reaches its seated position so as to impact the plug 30 firmly into its seat. In accordance with the present construction this delay is approximately 30 seconds and a 6800 ohm resistor 222 is placed in series with the heater element 202 to control the magnitude of the flow of current therethrough.

In order to reverse the rotation of motor 68, a cam operating motor 224 (FIGURE 4) is provided and is connected in series with contact 192 so as to be actuated by energization of relay 178. This cam motor 224 is ordinarily a conventional synchronous 110 volt motor and consequently requires the inclusion of a 500 ohm resistor 226 in series therewith in accordance with the present construction to provide for its operation from the 220 volt supply source 162.

In accordance with the present embodiment and with continued reference to FIGURE 4, the cam motor 224 is geared down by means not shown to rotate cams 228 and 229 at 15 revolutions per minute. The cams 228 and 229 function to mechanically open and close contacts 230, 232, 234 and 236. Contacts 230 and 232 are mechanically interlocked to operate in unison separately from contacts 234 and 236 which are also mechanically interlocked together for operation in unison. These pairs of contacts 230 and 232 and 234 and 236 respectively function to reverse the power phase between the motor terminals M2 and M3. Contacts 230 and 232 when actuated to close position respectively connect motor terminals M3 and M2 to power phases P2 and P1 of the supply source 162. Contacts 234 and 236 respectively connect motor terminals M2 and M3 to power phases P2 and P1 of the supply source 162 when actuated to closed position.

The rise on cam 229 is positioned relative to contacts 230 and 232 so that contacts 230 and 232 remain closed approximately 75 percent of the period of each cam revolution and constitutes the power impact stroke for driving the valve stem 44. Contacts 234 and 236 are closed by cam 228 for the remaining approximately 25 percent of each cam revolution to supply current to the motor 68 reversing or returning the impact driver 114 to its original position.

Thus when contacts 230 and 232 are closed, motor terminals M3 and M2 are connected to phases P2 and P1 of the supply source 162 and when contacts 234 and 236 are alternately closed, motor terminals M2 and M3 then are connected to the power phases P2 and P1 in reverse order.

In order to drive the operating valve stem 44 from closed to open position, suitable solenoid-type relays 238 and 240 are provided and respectively include windings 242 and 244 connected to the power conductor P3 by the open-pushbutton 168.

The relay 238 is provided with two mechanically interlocked switch blades 246 and 248 which respectively engage stationary contacts 250 and 252 when relay 238 is energized. The relay 238 is shown to be in de-energized condition wherein switch blades 246 and 248 are biased by means not shown, to be out of engagement with their respective contacts 250 and 252.

Similarly, the relay 240 is shown in de-energized condition and includes two movable mechanically interlocked switch blades 254 and 256 operable by the relay winding 244 and biased by means not shown to be out of engagement with their respective stationary contacts 258 and 260. In de-energized condition, switch blade 256 engages a stationary contact 262 and upon energization of relay 240, the blade 256 disengages contact 262 and engages contact 260 while blade 254 is moved by the interlock to engage contact 258.

Since switch contact 252 of relay 238 is in parallel circuit relationship with contact 186 of relay 176, actuation of switch blade 248 to engage contact 252 thereby connects motor terminal M1 with power phase conductor P3 of the supply source 162. Engagement of switch blade 246 with contact 250 facilitates the energization of a holding circuit 264 so as to permit the release of pushbutton 168 without interrupting the established motor circuit.

This holding circuit 264 includes in series with contact 250, a microswitch 266 and the stop pushbutton 170.

The microswitch 266 is affixed to the end bell 78 by bolts 268 and is normally closed. This switch 266 is actuated to open position by the travel nut 216 when it is shifted upwardly by rotation of the rotor 92 to a position indicated by dotted lines at 270 and which corresponds to the open position of the valve plug 30 in the valve body 22.

With reference now to FIGURES 1–4, the valve 20 is shown in closed position and the control system 140 for the power operator is in standby de-energized condition. In order to open the valve 20, the open-pushbutton 168 is depressed to establish an energizing circuit for relay windings 242 and 244 of relays 238 and 240. This circuit may be traced from the power phase conductor P3, through the open-pushbutton 168, through conductor 272, through windings 242 and 244, through conductor 274 to contact 196, and through the switch blade 188 engaging contact 196 to the power phase conductor P2.

When winding 242 is energized, switch blade 246 moves into engagement with contact 250 to establish the holding circuit 264. This circuit 264 may be traced from power phase conductor P2 through the switch blade 188 which is in engagement with contact 196, through conductor 274 which is connected to contact 196, through windings 244 and 242, through the switch blade 246 which is now in engagement with contact 250, through conductor 276 which is connected to contact 250, through the normally closed microswitch 266, through conductors 278 and 280, and through the stop-pushbutton 170 to power phase conductor P3.

Energization of relay 238 further engages switch blade 248 with contact 252 to connect motor terminal M1 to power phase conductor P3.

Energization of relay 240 engages switch blade 254 with contact 258 and switch blade 256 with contact 260 to connect cam contacts 230 and 234 to power phase conductor P1 through switch blade 256 and cam contacts 232 and 236 to power phase conductor P2 through switch blade 254.

The cam motor 224 is actuated by energization of relay 240 and the circuit therefor may be traced from power phase conductor P1, through switch blade 256 which engages contact 260, through conductors 280 and 282, through the resistor 226, through the cam motor 224, through conductors 284 and 286, and through the switch blade 254 to power phase conductor P2.

Operation of the cam motor 224 rotates the cams 228 and 229 to open and close contacts 230, 232, 234 and 236 as hereinbefore described to reverse phases between motor terminals M2 and M3 and thereby alternatively drive the rotor 92 of motor 68 in the forward impact and reverse repositioning directions.

When contacts 230 and 232 are closed, the rotor 92 is driven in a forward counterclockwise direction as viewed from FIGURE 2 and freely accelerates until the abutments 120 of the impact driver 114 engage the ears 122 of the driven member 50. The valve stem 44 which is nonrotatably affixed to the driven member 50 is rotated in a counterclockwise direction (FIGURE 2) in the internally threaded bushing 38 so as to axially shift the stem 44 and the valve plug 30 upwardly as viewed from FIGURE 1.

When cams 228 and 229 have rotated through approximately 75 percent of a revolution, the cam contacts 230 and 232 open and the cam contacts 234 and 236 close. With the cam contacts in this position, motor terminal M1 is still connected to power phase conductor P3 but the power phase conductors P1 and P2 connected to motor terminals M2 and M3 are reversed so as to drive the rotor 92 in a reverse clockwise direction as viewed from FIGURE 2 and thereby reposition the driver 114 for another counterclockwise impact stroke. The reverse repositioning stroke occurs for substantially only 25 percent of the cam revolution so as not to impart an impact to the driven member 50 to drive it in a reverse direction. This cycle of impact and reverse repositioning strokes continues until the valve plug 30 is shifted to its fully opened position.

During the impact strokes, rotation of the rotor 92 shifts the rotatably restrained microswitch actuating nut 216 upwardly a predetermined distance for each cycle of operation. When the valve plug 30 reaches its fully opened position, the nut 216 engages the microswitch 266 to open the contacts thereof and thereby interrupt the holding circuit 264 for the relays 238 and 240. This action de-energizes relays 238 and 240 to stop the motor 68 and thereby prevent any further action of the operator, leaving the valve 20 remaining in its fully opened position.

The closing operation of valve 20 is substantially the same as the opening operation except for the operation of the time delay relay 204 which functions to permit the motor 68 to operate a predetermined time period after the valve plug 30 reaches its seat in the valve body 22.

Thus, in order to close the valve 20 and with continued reference to FIGURES 1–4, the close-pushbutton 166 is depressed to establish a circuit for energizing the windings 172 and 174 of relays 176 and 178. This winding energizing circuit may be traced from the power phase conductor P3, through the close-pushbutton 166, through conductor 288, through windings 172 and 174, through a conductor 290 connected to contact 260 of de-energized relay 240, and through switch blade 256 which engages contact 260 in its de-actuated position to power phase conductor P1.

Energization of relay winding 172 actuates switch blade 182 to engage contact 186 and thereby connect motor terminal M1 to power phase conductor P3. Switch blade 180 also actuated by the energized relay winding 172 engages contact 184 to establish the holding circuit 198 and thereby permit the close-pushbutton to be released without interruption of the motor circuit. This holding circuit 198 may be traced from power phase conductor P3, through the stop-pushbutton 170, through conductor 280, through the normally closed contacts 200 of time delay relay 204, through conductor 292 which connects to contact 184, through switch blade 180 engaging contact 184, through relay windings 172 and 174, through conductor 290 which is connected to contact 262 of de-energized relay 240 and through the switch blade 256 which engages contact 262 in its de-actuated position to the power phase conductor P1.

By this circuitry, it will be appreciated that the relays 178 and 176 and relays 238 and 240 are electrically interlocked so that relay 240 must be de-energized before relays 178 and 176 can be energized, and, correspondingly, relay 178 must be de-energized before relays 238 and 240 can be energized.

Actuation of switch blades 188 and 190 to engage contacts 192 and 194 connects cam contacts 230 and 234 to power phase conductor P2 and cam contacts 232 and 236 to power phase conductor P1. Actuation of switch blade 188 to engage contact 192 also energizes the cam motor 224 and the time delay circuit 206.

The circuit for cam motor 224 may be traced from power phase conductor P2, through the activated switch blade 188 which engages contact 192, through conductors 294 and 282, through resistor 226, through the cam motor 224, through conductor 284 and 286 to contact 194 and through switch blade 190 engaging contact 194 to power phase conductor P1.

The cam motor 224 now operates through relay 178 to establish the two reversing motor circuits through the cam operated contacts 230, 232, 234 and 236. When contacts 230 and 232 are closed, the motor terminals M3 and M2 are respectively connected to power phase conductors P2 and P1. When the cam operated contacts 234 and 236 are closed, motor terminals M3 and M2 are respectively connected to power phase conductors P1 and P2. This combination of motor terminal connections causes the motor 68 to rotate in a clockwise direction as the return or repositioning stroke of the opening operation. Cam contacts 230 and 232 now control the clockwise rotation whereas cam contacts 234 and 236 controlled this direction of rotation for the valve opening operation. Thus, the clockwise rotation of the rotor 92 is the impact stroke for the valve closing operation and is controlled by cam contacts 230 and 232 which always control the impact stroke. During the closing operation, the counterclockwise rotation of the rotor 92 is controlled by cam contacts 234 and 236 which always control the return or repositioning of the impact driver 50.

Thus the closing of valve 20 is facilitated by repeated and successive impacts as was the valve opening operation until the plug 30 engages in its seat in the valve body 22.

As the valve stem 44 is rotated in a clockwise direction to shift the plug 30 downwardly toward its seat, the microswitch actuating nut 216 is shifted downwardly from its dotted line position 270 indicated in FIGURE 1 by the rotation of rotor 92. When initial contact is established between the valve plug 30 and its seat in the valve body 22, the nut 216 engages the normally open microswitch 208 to close the contacts thereof and establish the heater circuit 206.

This heater circuit 206 may be traced from power phase conductor P2, through the switch blade 188 activated to engage contact 192, through conductors 294 and 282, through resistor 226, through cam motor 224, through conductor 284, through resistor 222, through the time delay relay heater element 202, through the microswitch 208 which is actuated to closed position by nut 216, through conductors 278 and 280, and through the stop-pushbutton 170 to power phase conductor P3. While the heating element 202 is being heated to its contact actuating temperature, the motor 68 continues to operate and impacts the valve plug 30 firmly into its seat. This time delay period during which the valve plug 30 is being firmly impacted into its seat is approximately 30 seconds in accordince with the present construction. When the heating element 202 has heated sufficiently, it causes the contacts 200 of the time delay relay 204 to open and thereby interrupt the holding circuit 198. This de-energizes the relay windings 172 and 174 to stop the operation of the motor 68. The holding circuit 198 may be interrupted at any time during the valve closing operation to stop the motor 68 by depression of pushbutton 170.

By the above valve operator construction, it will be appreciated that the force of the motor operator 68 is applied to the valve stem 44 in the form of kinetic energy. The rotation of the rotor 92, together with the mass of the armature section 94 and the driver 114, supplies a constant source of kinetic energy for each blow of the driver 114 against the driven member 50. This uniform kinetic energy is applied to the driven member 50 and transformed into force and motion according to the amount of force required to move the valve plug 30. When the valve plug 30 is in a tightly seated position, a relatively large force is required to move it. Thus, in accordance with the principles of the present invention, the constant magnitude of kinetic energy applied by the impact driver 114 to the valve stem 44 is transformed into a large force that correspondingly moves the valve plug 30 a relatively short distance. On the other hand, when the valve plug 30 is simply being positioned, force required to move the valve stem 44 and plug 30 is relatively small and much less than that force required to readily unseat or to firmly seat the valve plug. Thus the uniform magnitude of kinetic energy received from the impact driver 114 is transformed into a relatively small force causing the stem to move over a relatively great angular distance.

Thus, the impact principle has the effect of providing a variable "gear train" or variable "mechanical advantage" which efficiently transmits force and motion to the valve stem 44 in an economical manner.

Referring now to FIGURES 5–8, wherein another construction embodying the principles of the present invention is illustrated, the reference numeral 300 generally designates a relatively large size power operated globe-type valve which comprises a valve body 302 of conventional construction having inlet and outlet passage 304 and 306 and a cross bore 308. An operating valve plug stem 310 is connected to the valve plug 312 and the stem 310 may be integral with the plug, as shown, or separable. This valve stem 310 is provided with a threaded section 314 which extends upwardly through an inverted cup shaped housing frame section 315 and engages an internally threaded yoke bushing 316.

Yoke bushing 316 is coaxially mounted for rotation relative to stem 310 in bore 317 formed in housing 315 coaxial with cross bore 308 by conventional spaced-apart ball bearing assemblies 318 and 320. The outer race 322 of bearing 318 is press-fitted into an annular recess 324. Bearing 318 is confined against axial movement between the downwardly facing planar end face 326 of the recess 324 which abuts the outer race 322 and a washer 328 which abuts the inner race 330 and is concentrically supported on the flanged end portion 332 of bushing 316.

The outer race 334 of ball bearing assembly 320 is press-fitted into an annular recess 336 extending inwardly from the upwardly facing planar end face 338 of valve body 302. This bearing 320 is restrained against axial movement between the planar end face 340 of recess 336 which abuts the outer race 334 and a washer 342 concentrically mounted in spaced relation to bushing 316 in abutting relation to the inner race 344 of the bearing.

Keyed to the yoke bushing 316 as indicated at 346 and radially abutting the washer 342 is the driven member 348 of the impact coupling indicated at 350. The driven member 348 is coaxial with the bushing 316 and stem 310 and is provided with two diametrically opposed ears 352 (FIGURE 6) formed integral with a hub portion 354 and extending radially outwardly therefrom. These ears 352 simultaneously abuttingly engage two diametrically opposed lugs 356 (FIGURE 6) which project downwardly from the annular planar end face 358 of the inverted cup-shaped impact coupling driver 360. The driver 360 is coaxial with bushing 316 and is mounted for rotation relative to the bushing 316 by a ball bearing assembly 362 which has its inner race 364 press-fitted onto the upper end of the bushing 316. Pressed between the outer race 366 of ball bearing 362 and the internal wall 368 forming the inverted recess of the driver 360 is an annular spring 370 which is H-shaped in cross section (FIGURE 7), the purpose of which will become apparent as the description proceeds. The ball bearing 362 is restrained against axial movement between an annular shoulder 372 formed on the end wall 374 of the driver 360 and the upwardly facing planar end face of a handwheel bushing 376 threadedly engaging the yoke bushing 316 and affixed to the driven member 348 by machine screws indicated at 378.

In order to rotate the impact coupling driver 360, a motor 380 is provided having an armature shaft 382 mounted for rotation coaxial with the valve stem 310. This shaft 382 extends downwardly into a bore 384 formed in a boss portion 386 projecting upwardly from the end wall 374 of driver 360 and is suitably keyed thereto as indicated at 388. The upper end of the armature shaft 382 is journalled in a conventional ball bearing 390 press-fitted into a socket 392 centrally affixed to a motor end bell 394 of motor housing 396. The motor armature 398 is affixed to the armature shaft 382 for rotation therewith in spaced concentric relation to the motor stator 400 which is suitably affixed to the cylindrical housing section 402 of motor housing 396.

Between the armature 398 and the ball bearing 390 a standard fan 404 is mounted for rotation with armature shaft 382 and draws air upwardly through an annular end plate 406 on which the motor housing 396 is supported and suitably secured to. By this structure, it will be appreciated that the fan 404 functions to dissipate the heat developed by the continual reversals of the motor 380 as hereinbefore described with respect to the embodiment of FIGURES 1–4.

The end plate 406 is mounted over the valve body 302 and section 315 by a cylindrical motor mounting stand 408.

Referring now to FIGURES 5 and 8, an indicator 410 is provided in order to indicate the relative position of the valve plug 312 in the valve body 302 and to keep the valve stem 310 from rotating. This indicator 410 comprises a collar portion 412 affixed to the stem 310 as by set screws 414 and a rectangular shank portion 416 which radially extends through a vertical slot 418 formed in the frame section 315. The opposed planar side faces of the shank portion 416 abut the opposed walls of slot 418 in sliding engagement therewith so as to prevent rotation of the stem 310.

This shank portion 416 of indicator 410 extends beyond the cylindrical face of the frame section 315 and actuates microswitches 208 and 266 suitably secured to the frame section. These microswitches 208 and 266 are the same as those described in the embodiment of FIGURES 1–4 and function to stop the operation of the motor 380 at the fully closed and opened positions of plug 312 as hereinbefore described.

By this structure, it will be appreciated that rotation of the driver 360 by motor 380 imparts impacts to the driven member 348 of impact coupling 350 to drive the driven member 348 and the yoke bushing 316 keyed thereto in a selected direction. Since the yoke bushing 316 threadedly engages the valve operating stem 310 which is rotatably restrained by shank 416, rotation of the yoke bushing axially shifts the valve stem 310 toward open or closed position.

Thus, by the above structure, it will be appreciated that the armature shaft 382, the impact coupling driver 360, the driven member 352, the yoke bushing 316 and the valve operating stem 310 are all coaxial. In order to maintain this assembled coaxial relationship between the foregoing parts so that both driver lugs 356 simultaneously abut the ears 352 of the driven member 348, the bearings 390, 362, 320 and 318 all are normally required to be in precise alignment. When these bearings 390, 362, 320 and 318 are not perfectly aligned due to wear or to manufacturing imperfections, one of the lugs 356 will engage its corresponding ear 352 before the other lug does. Consequently, under these conditions, an unbalanced radial force is applied to the driven member 348 of impact coupling 350 and this unbalanced force is transmitted to bearing 362 which is not constructed to absorb such radial loads.

Thus, in order to eliminate the application to bearing 362 of any unbalanced radial loads resulting from misalignment of bearings 390, 362, 320 and 318, the upright annular H-shaped spring 370 is provided between the bearing 362 and the driver 360. This spring 370 serves to shift the axis of the driver 360 to properly align it so that the radial force on the driven member 348 is minimized. Thus, the spring 370 absorbs the unbalanced radial forces transmitted by the driver 360 and insures that the applied force acting on the driven member 348 is entirely rotary in nature.

Operation of the motor 380 is accordingly controlled by the control circuit 140 illustrated in FIGURE 4 and described in connection with the embodiment of FIGURES 1–4. Consequently, no further detailed discussion thereof is required.

Thus, in operation, the reversal of power phases of motor 380 by the control circuit 140 causes the continuous reversal of the direction of rotation of the motor armature 398 at predetermined intervals as hereinbefore described to thereby rotate the impact coupling driver 360 through a series of successive and alternating forward impact strokes and reverse repositioning strokes. The rotatably restrained valve operating stem 310 is thereby shifted axially toward open or closed plug positions entirely by the impacts applied to rotate the driven member 348 and the yoke bushing 316.

The microswitch 266 functioning in the same manner as hereinbefore described stops the operation of the motor 380 when the valve plug 312 is shifted to its fully opened position. The microswitch 208, as also hereinbefore described, is actuated when the valve plug 312 initially engages its seats and stops motor 380 through activation of time delay relay 204 a predetermined period following the initial engagement of the plug 312 with its seat so that the plug 312 is firmly seated by impact.

Referring now to FIGURES 9–13, a further construction embodying the principles of the present invention is illustrated wherein the reference numeral 430 generally designates a power operated plug valve. Valve 430 is essentially of conventional construction and is provided with a body 432 having inlet and outlet passages 434 and 436, end flanges 438 for suitable pipe line connections, and a tapered cross bore 440 for seating the tapered plug 442. An operating valve plug stem 444 is connected to the larger diameter end of the plug 442 and the stem 444 may be integral with the plug, as shown, or separable.

Plug 42 is inserted in bore 440 through the top of the body 432 and urged into tight seating disposition by well-known conventional means. The plug stem 444 projects beyond the top of body 432 through a packing gland 446 and a cover plate 448 which is affixed to the top of body 432 by stud and nut assemblies indicated at 450. Gland nut 452 of the packing gland 446 retains a conventional seal 454 around the stem 444. The gland nut 452 and an impact coupling stop plate 456 abutting the planar end face 458 of nut 452 are affixed to the cover 448 by machine screws 460. The present invention is applicable as well to plug valves having the plug stem on the smaller end of the plug.

Valve stem 444 is hollow as indicated at 461 and a lubricating tube 462 terminating in a fitting 464 is mounted on the stem 444 for rotation therewith and projects radially outwardly from the stem 444 above the stop plate 456. This lubricating tube 462 facilitates the introduction of lubricant under pressure through the stem 444 to the plug 442. Application of lubricant under pressure to the plug 442 provides jacking forces to unseat the valve plug 442 and lubricant will also pass into appropriate lubricating grooves 466 in the valve plug surface. Complete lubricant sealing of the plug 442 is facilitated by additional lubricating grooves (not shown) in the plug 442 and the valve body 432.

In accordance with the present invention, the portion of the valve stem 444 projecting above the valve body 442 is provided with square shank section 468 (FIGURE 10) which extends through a mating square hole 470 formed axially in the driven member 472 of a passing detent type impact coupling 474 as will be hereinafter described. Stem 444 terminates in a reduced diameter threaded section 476 which threadedly engages an internally threaded driven member securing ring 478. Thus, the driven member 472 is restrained against axial movement between the securing ring 478 and an annular shoulder 480 formed integral on the valve stem 444.

Affixed to the bottom of the driven member 472 as by screws 482 (FIGURE 10), is a driven member stopping lug 484. This stopping lug 484 projects downwardly into a horizontal plane between angularly spaced apart ears 486 provided on the stopping plate 456 and projecting upwardly from the planar end face 488 thereof. These ears 486 are spaced substantially 90° apart so as to limit the angular travel of the driven member to 90°.

The driver 490 of the impact coupling 474 is provided with an inverted cup-shaped body rotatably mounted on a ball bearing assembly 492 in surrounding spaced relationship to the driven member 472. The inner race 494 of the ball bearing assembly is press-fitted on the securing ring 478 above the driven member 472 and an H-shaped spring 496 is pressed between the outer race 498 of bearing assembly 492 and the internal wall 500 forming the recess 502 in the body of the driver 490. This H-shaped spring 490 is the same as the H-shaped spring 270 described in connection with the embodiment of FIGURES 5–8 and functions in the same manner to properly align the axis of the driver 490 with that of the driven member 472 to thereby eliminate the application of unbalanced radial forces to the ball bearing assembly 492 during impact. Since this H-shaped spring 490 is fully described with respect to the embodiment of FIGURES 5–8, no further description thereof is required.

In accordance with the present invention and with reference to FIGURES 10 and 12, the driver 490 of the passing detent coupling 474 is provided with three abutments 508, 510 and 512 projecting radially inwardly into the recess 502 from the internal wall 500. The abutments 508 and 510 are spaced vertically apart in the same vertical plane, one above the other. Abutment 512 is diametrically opposite the abutments 508 and 510 and projects in a horizontal plane between the abutments 508 and 510.

These abutments 508, 510 and 512 respectively abuttingly engage ears 514, 516 and 518 which are formed integral with the hub portion 520 of driven member 472 and project radially outwardly therefrom. The ears 514 and 516 are spaced vertically apart in the same vertical plane, one above the other. The ear 518 is diametrically opposite ears 514 and 516 and projects in a horizontal plane between the ears 514 and 516.

In assembled relationship, the ear 518 is in the same horizontal plane as the abutment 512 while ears 516 and 518 respectively are in the same horizontal planes as the abutments 508 and 510. Rotation of the driver 490 approximately 10° in a counterclockwise direction, as viewed from FIGURE 10, causes abutments 508, 510 and 512 to respectively abuttingly engage ears 514, 516 and 518. When driver 490 is rotated in a clockwise direction as viewed from FIGURE 10, the ear 518 passes between abutments 508 and 510 while abutment 512 passes between ears 514 and 516.

By this structure, it will be appreciated that the angular magnitude of the impact stroke of the driver 490 is 360° less the angular dimension of one of the abutments or ears of the driver 490 and driven member 472 respectively. It is apparent, by this construction, that the impact applied by the driver 490 is accomplished in a balanced manner since two of the three separate points of abutting engagement between the abutments and the ears are at diametrically opposed points on the driven member 472.

The passing detent impact coupling 474 further in accordance with the present invention may be substituted for the impact coupling 350 described in connection with the embodiment of FIGURES 5–8 depending upon the speed and torque characteristics of the motor used to rotate the driver of the impact coupling.

With reference now to FIGURE 9, in order to rotate the driver 490 of the impact coupling 474, a motor 526 is provided and is mounted as by bolts 528 to a cylindrical motor mounting stand 530. Stand 530 is affixed to a mounting plate 532 by bolt and nut assemblies indicated at 534 and the mounting plate 532 is suitably affixed to the cover 448.

This motor 526 is, as hereinbefore described in connection with the embodiments of FIGURES 1–8, of any conventional type and is preferably a 3-phase induction type squirrel cage motor having a stator (not shown) and an armature (not shown) for driving an armature shaft 536. The motor 526 also is provided with a fan (not shown) rotated by the armature shaft 536 to draw air up through the opening 538 formed in stand 530 so as to dissipate the heat developed by operation of the motor.

The motor 526 is mounted, in accordance with the present invention, so that the armature shaft 536 is coaxial with the valve stem 444 and extends downwardly into a bore 540 formed in boss portion 542 projecting upwardly from the planar end face of end wall of the driver 490. The driver 490 is affixed to the downwardly projecting end of the armature shaft 536 as by keys 546 and set screws 548 or any other suitable means.

Further in accordance with the present invention the H-shaped spring 496 hereinbefore described may be replaced under some conditions by mounting resilient rubber pads (not shown) between the mounting stand 530 and the mounting plate 532. These rubber pads allow the driver 490 to properly align itself with the driven member 472 so as to eliminate the transmission and application of unbalanced radial forces to the ball bearing assembly 492. In this case, the driver 490 is machined so that the outer race 498 of bearing 492 fits snugly into it.

In order to facilitate the reversal of the motor 526 so as to impart successive and repeated impacts to the driven member 472 of the impact coupling 474 to thereby rotate the valve operating stem 444 in a selected direction, a reversing motor control circuit generally indicated at 556 (FIGURE 13) is provided for operating and reversing the rotation of the motor armature at predetermined intervals. Thus, with continued reference to FIGURE 13, the motor control circuit 556 is connected by power conductors C1 and C2 to a suitable 115 volt supply source 557 and includes a function control circuit 558, a programming unit circuit 560, and a reverse control circuit 562.

The function control includes a standard two-pole double throw actuating switch 564 having its poles connected to the 115 volt power source 557 by power conductor C2. One pole of the switch 564 in its left-hand circuit energizing position is in series circuit relationship with a microswitch 566 and the relay winding 568 of a relay 570. In its right-hand circuit energizing position, switch 564 is in series circuit relationship with a microswitch 572 and the relay winding 574 of a relay 576.

The microswitches 566 and 572 are suitably mounted on the stop plate 456 (FIGURE 9) and are actuated by the lubricating tube 462 when the valve plug 442 respectively reaches its fully opened and closed positions.

The relay 570 is provided with three mechanically interlocked movable switch blades 578, 580 and 582 which respectively engage contacts 584, 586 and 588 when the relay winding 568 is energized. This relay 570 is shown to be in de-energized condition wherein the movable switch blades 578, 580 and 582 are biased by means not shown to be out of engagement with their respective contacts 584, 586 and 588.

Similarly, the relay 576 is shown to be in de-energized condition and includes three movable mechanically interlocked switch blades 590, 592 and 594 operable by energization of relay winding 574 and biased, by means not shown, to be out of engagement with their respective contacts 596, 598 and 600.

The function control network 558 also is provided with neon indicating lights 602 and 604 which respectively indicate the opening and closing operations of the valve 430 when illuminated. The lights 602 and 604 are respectively in parallel circuit relationship with relay windings 568 and 574.

The programming unit circuit 560 includes a conventional 115 volt cam drive motor 610 in series circuit relationship with contacts 584 and 596 of relays 570 and 576 so as to be actuated by energization of either relay 570 or 576. The cam motor 610 drives an impact stroke cam 612 and a return stroke cam 614 to respectively actuate switch blades 616 and 618 mounted on cam followers 620 and 622. The rise of cam 612 moves switch blade 616 into engagement with contact 624 and the rise on cam 614 moves its switch blade 618 into engagement with contact 626.

The reverse control electrical network 562 includes two relays 630 and 632. The relay 630 is provided with a winding 634 in series circuit relationship with contact 636. This contact 636 is in series with two parallel circuits, one of which contains contacts 598 and 626 and the other of which contains contacts 588 and 624. Energization of relay winding 634 disengages a switch blade 638 of relay 630 from its contact 640. This switch blade 638 normally engages contact 640 when the relay 630 is de-energized and is mechanically interlocked with power phase contacts 642, 644 and 646 to close these contacts when winding 634 is energized. These power phase contacts 642, 644 and 646 connect power phase conductors P1, P2 and P3 respectively to motor terminals M1, M2 and M3 of motor 526.

The relay 632 similarly is provided with a winding 648 in series circuit relationship with contact 640. Contact 640 is in series with two parallel circuits, one of which contains contacts 600 and 624 and the other of which contains contacts 586 and 626. Energization of relay winding 648 disengages switch blade 650 from its contact 636. This switch blade 650 is mechanically interlocked with power phase contacts 652, 654 and 656 to close these contacts upon energization of the relay 632. The contacts 652, 654 and 656 respectively connect the power phase conductors P2, P1 and P3 to motor terminals M1, M2 and M3.

By this circuitry, it will be appreciated that the two sets of power phase contacts 642, 644 and 646, and 652, 654 and 656 function to interchange the power phase conductors P1 and P2 between motor terminals M1 and M2. This serves to reverse the rotation of the motor 526 depending on which set of power phase contacts are closed. The power phase conductors P1, P2 and P3 are connected to a suitable 220 volt 3-phase supply source indicated at 658.

In operation, and with reference to FIGURES 9–13, the valve plug 442 is shown to be in its closed position. Thus, in order to rotate the plug 442 to open position, the double-throw switch 564 is moved to its left-hand position as viewed from FIGURE 13. This establishes an energizing circuit for the relay winding 568 which may be traced from conductor C2 through switch 564, through microswitch 566, and through winding 568 to conductor C1. The neon light 602 being in parallel circuit relationship with winding 568 is illuminated to indicate the commencement of the valve opening operation.

Energization of relay winding 568 actuates switch blades 578, 580 and 582 to respectively engage their contacts 584, 586 and 588.

Engagement of switch blade 578 with contact 584 establishes an energizing circuit for the cam motor 610. This circuit may be traced from conductor C2, through switch 564, through conductor 664, through cam motor 610, through conductors 666 and 668 to contact 584, through switch blade 578, and through conductor 670 to conductor C1.

Cam motor 610 now rotates the cams 612 and 614 to alternately engage switch blades 616 and 618 with contacts 624 and 626. Engagement of switch blade 616 with contact 624 establishes a circuit for energizing relay 630. This circuit may be traced from power phase conductor P3, through relay winding 634 of relay 630, through conductor 672 to contact 636, through switch blade 650 which is in engagement with contact 636, through conductors 674 and 676 to contact 588, through switch blade 582 which engages contact 588, through conductor 678, through the cam switch blade 616 which engages contact 624 and back to power phase conductor P3.

Energization of relay 630 disengages switch blade 638 from contact 640 and closes power phase contacts 642, 644 and 646 to thereby connect motor terminals M1, M2 and M3 respectively to power phase conductors P1, P2 and P3. This phase relationship rotates the motor 526, and consequently the impact driver 490, in a counterclockwise direction. The rotating impact driver freely accelerates until the abutments 508, 510 and 512 of driver 490 simultaneously strike the ears 514, 516 and 518 of the driven member 472 of the impact coupling 474 as hereinbefore described. The kinetic energy transmitted to the driven member 472 rotates it in a counterclockwise direction to start the rotation of valve plug 442 towards its open position.

As the cams 612 and 614 continue to rotate, the switch blade 616 disengages its contact 624 and switch blade 618 engages its contact 626. Disengagement of switch blade 616 with contact 624 de-energizes relay 634 to move switch blade 638 into engagement with contact 640. This establishes a circuit for the reverse repositioning stroke of the driver 490 and reverses the rotation of the motor 526 so that it rotates in a clockwise direction. This circuit may be traced from power phase conductor P1, through relay winding 648 to contact 640, through switch blade 638 engaging contact 640, through conductor 678 to contact 586, through switch blade 580 which engages contact 586, through conductor 680, through switch blade 618 now engaging contact 626, and through contact 626 to power phase conductor P3.

This circuit energizes the relay 632 to disengage switch blade 650 from contact 636 and closes power phase contacts 652, 654 and 656 to connect the power phase conductors P1, P2 and P3 respectively to motor terminals M2, M1 and M3. This reversal of power phase between terminals M1 and M2 and power phase conductors P1 and P2 causes motor 526 to rotate now in a clockwise direction as long as the rise on cam 614 keeps switch blade 618 in engagement with contact 626.

The driver 490 consequently reverses rotation and repositions itself for another forward impact stroke. Impacting of the valve stem 444 continues in the manner described until the valve plug 442 has been rotated through an angle of 90° to its fully opened position. At this fully opened position, the lubricant tube 462 engages the microswitch 566 to open the contacts thereof. This interrupts the circuit to relay 570 so as to de-energize the winding 568 and to thereby stop the motor 526.

In the beginning of the opening operation, in the event that the switch 564 is accidentally moved to its "close" position, the motor 526 will not start since the lubricant tube 462 holds the microswitch 572 open to prevent a closing control circuit from being established.

At the end of a closing or opening operation, the lubricant tube 462 may, under certain conditions, come to rest a small distance from the microswitches 572 or 566. In this case the impacting operation would continue since neither of the microswitches 566 or 572 are engaged by the tube 462 to be opened to thereby disestablish the operating circuit. In order to prevent the next impact blow from moving the plug 442 past its fully open or closed position, the ears 486 on the stop plate 456 function to abuttingly engage the stop lug 484 on driven member 474 to thereby assure the limitation of plug travel to exactly 90°.

The closing operation of the valve 430 is the same as the opening operation hereinbefore described except that when switch 564 is placed in its closed position, relay winding 574 is energized and contacts 596, 598 and 600 substitute for contacts 584, 586 and 588 in the control circuit.

The cams 612 and 614 function to provide a "no-current" period in addition to the "forward impact" and "reverse repositioning" periods. During this "no-current" period both switch blades 616 and 618 are disengaged from contacts 624 and 626 so that there is no current to the motor 526 and, consequently, the motor 526 is allowed to coast for part of the return or repositioning stroke. The precise time periods necessary for efficiently operating in these three periods, forward, reverse and coasting in reverse, depends upon the plug loading, amount of plug lubrication and other valve factors.

By the above structure and operation, it will be appreciated that the operation of switch blades 638 and 650 of relays 630 and 632 function to establish an electrical interlock and prevents both relay windings 634 and 648 from being energized at the same time.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a power driven valve operating mechanism having a valve closure member movable between open and closed positions, a valve stem connected to said valve closure member, a reversibly operable motor means for moving said stem in a selected direction to thereby move said closure member, means coupling said stem with said motor means for transmitting the energy delivered by said motor means to move said stem by impact, and control means for automatically repeatedly reversing said motor means to impart successive and repeated drive impacts to said stem in a selected direction.

2. In a power driven valve operating mechanism, a valve stem movable between open and closed positions, reversibly operable motor means for moving said valve stem in a selected direction to its opened or closed position, means coupling said motor means to said valve stem and capable of transferring the energy delivered by said motor means to move said stem by drive impacts, and control means for said motor means effective to automatically repeatedly reverse the direction of rotation of said motor means at predetermined intervals to impart repeated and successive drive impacts to said stem in a selected direction.

3. The power driven valve operating mechanism as defined in claim 2 wherein means are provided to mount said stem for limited axial and rotational movement.

4. The power driven valve operating mechanism as defined in claim 2 wherein means are provided to rotatably mount and axially restrain said stem.

5. The power driven valve operating mechanism as defined in claim 2 wherein means are provided to mount said stem for limited axial movement and to rotatably restrain said stem.

6. The power driven valve operating mechanism as defined in claim 2 wherein means are provided to coaxially mount said motor means, said stem and said means coupling said motor means to said stem.

7. The power driven valve operating mechanism as defined in claim 2 wherein said motor means comprises a reversibly operable electric motor having a plurality of power phases and wherein said control means is provided with means for automatically repeatedly reversing at least two of said power phases at predetermined intervals to thereby repeatedly reverse the direction of rotation of said motor.

8. In the power driven valve operating mechanism as defined in claim 7 wherein said control means is provided with limit switch means for stopping said motor when said stem reaches its fully opened and closed positions.

9. In the power driven valve operating mechanism as defined in claim 7 wherein said means coupling said motor to said stem comprises a rotary driven member operatively connected to said stem, and a driver operatively connected to said motor and freely rotatable for a predetermined magnitude of angular travel relative to said driven member and said stem, said member and said driver having portions engaging each other to restrict the free rotation of said driver to said predetermined magnitude of angular travel so that the momentum developed by said driver during free rotation thereof is imparted to said driven member by impact.

10. In the power driven valve operating mechanism as defined in claim 9 wherein said control means is provided with means for operating said motor to rotate through a forward impact stroke and a reverse repositioning stroke in sequence, said motor being temporarily de-energized during the terminal portion of said repositioning stroke before said forward impact stroke begins again in the opposite direction whereby no appreciable impact is imparted to said driven member by said driver during said repositioning stroke.

11. In a valve assembly having a body, a flow passage therethrough and a valve member capable of being axially and rotatably shiftable to open and closed positions, an operating stem for said valve member and having a threaded section, a fixed internally threaded yoke bushing member engaging the threaded section of said stem so that rotation of said stem in said bushing axially shifts said stem and said valve member in a selected direction, and means for rotating and thereby axially shifting said stem in a selected direction comprising a reversibly operable motor having a rotatable armature shaft and a plurality of power phases, an impact coupling operatively connecting said stem with said armature shaft and capable of translating the rotary motion of said armature shaft into drive impacts for rotating said stem, and electrical control circuit means for automatically reversing the power phases of said motor at predetermined intervals to thereby automatically repeatedly reverse the rotation of said armature shaft and impart successive drive impacts to said stem in a selected valve actuating direction.

12. The valve assembly as defined in claim 11 wherein means are provided for coaxially mounting said stem, said coupling and said armature shaft.

13. The valve assembly as defined in claim 11 wherein said coupling comprises a rotary driven member operatively connected to said stem, and a driver operatively connected to said armature shaft and freely rotatable for a predetermined magnitude of angular travel relative to said driven member and said stem, said member and said driver having portions engaging each other to restrict the free rotation of said driver to said predetermined magnitude of angular travel so that the momentum developed by said driver during free rotation thereof is imparted to said driven member by impact.

14. The valve assembly as defined in claim 13 wherein said driver is provided with an inverted cup-shaped body having a hollow interior and at least two diametrically opposed abutments extending radially inwardly from the internal wall forming said hollow interior, said driven member extending up into said hollow interior in spaced concentric relation to said driver and having at least two diametrically opposed ears extending radially outwardly into the path of corresponding ones of said abutments to be abuttingly engaged by said abutments when said driver is rotated.

15. The valve assembly as defined in claim 13 wherein said driver is coaxially connected to said armature shaft and provided with vanes extending radially outwardly therefrom to be rotated with said shaft to thereby dissipate the heat developed by the reversal of said motor.

16. The valve assembly as defined in claim 11 wherein said control circuit means is provided with limit switch means for de-energizing said motor when said valve member reaches fully opened or closed positions, said switch means being mounted for actuation by means axially shiftable by the rotation of said armature shaft.

17. The valve assembly as defined in claim 11 wherein said control circuit means is provided with time delay means operable to continue operation of said motor in closing said valve member a predetermined period after said valve member engages its seat in said body to thereby firmly impact said valve member into a seated position.

18. The valve assembly as defined in claim 11 wherein first and second relay means are provided for operating said motor to respectively shift said valve member to opened and closed positions, and means electrically interlocking said first and second relay means to prevent energization of said first and second relay means at the same time.

19. In a valve assembly having a body, a flow passage therethrough, a valve member shiftable to open and close said passage, and an operating stem connected to said valve member; and drive means for driving said operating stem in a selected direction comprising a reversibly operable motor, coupling means operably interconnecting said motor and said stem and capable of transmitting the energy delivered by said motor to said stem by impact, and control means for said motor effective to automatically repeatedly reverse said motor at predetermined intervals to impart successive drive impacts to said stem in a selected valve actuating direction.

20. In a valve assembly having a body, a flow passage therethrough and a valve member capable of being axially shiftable to open and closed positions, a rotatably restrained operating stem connected to said valve member and having a threaded connection, a rotatably mounted internally threaded yoke bushing member engaging said threaded section of said stem so that rotation of said bushing member axially shifts said stem and said valve member in a selected direction, and means for rotating said bushing member in a selected direction comprising a reversibly operable motor having a rotatable armature shaft and a plurality of power phases, an impact coupling operatively connecting said bushing member with said armature shaft and capable of translating the rotary motion of said armature shaft in drive impacts for rotating said bushing member, and electrical control circuit means for automatically reversing the power phases of said motor at predetermined intervals to thereby automatically repeatedly reverse the rotation of said armature shaft and impart successive drive impacts to said bushing member to rotate said member and shift said stem in a selected valve actuating direction.

21. The valve assembly as defined in claim 20 wherein said control circuit means is provided with switch means for deenergizing said motor when said valve member reaches fully opened or closed positions and wherein means rotatably restraining said stem is operable to actuate said switch means.

22. The valve assembly as defined in claim 20 wherein said coupling comprises a rotary driven member operatively connected to said stem, and a driver operatively connected to said armature shaft and freely rotatable for a predetermined magnitude of angular travel relative to said driven member and said stem, said member and said driver having portions engaging each other to restrict the free rotation of said driver to said predetermined magnitude of angular travel so that the momentum developed by said driver during free rotation thereof is imparted to said driven member by impact.

23. The valve assembly as defined in claim 22 wherein said driver is coaxially mounted relative to said bushing member and said driven member and wherein means are provided eliminating the transfer of any unbalanced radial forces to said driven member so that substantially all of the force applied to said driven member is rotary in nature.

24. The valve assembly as defined in claim 23 wherein said driver is concentrically journalled on bearing means fixed relative to said bushing member and wherein said means for eliminating the transfer of unbalanced radial force comprises an annular spring having an upstanding H-shaped cross section and pressed between said bearing means and said driver so as to maintain the alignment between said driver and said driven member and thereby absorb any unbalanced radial forces delivered by said driver.

25. In a plug valve assembly having a body, a flow passage therethrough, and a valve plug member seated in said body and rotatable to opened and closed positions; an operating stem connected to said valve member and means for rotating said stem with said valve plug member in a selected direction comprising a reversibly operable motor having a rotatable armature shaft and a plurality of power phases, an impact coupling operatively connecting said stem with said armature shaft and capable of translating the rotary motion of said armature shaft into drive impacts for rotating said stem, and electrical control circuit means for automatically reversing the power phases of said motor at predetermined intervals to thereby automatically repeatedly reverse the rotation of said armature shaft and impart successive drive impacts to said stem in a selected valve actuating direction.

26. The plug valve assembly as defined in claim 25 wherein said control circuit means is provided with limit switch means for de-energizing said motor when said valve plug member reaches fully opened and closed positions.

27. The plug valve assembly as defined in claim 26 wherein the seating surfaces of said valve plug member is lubricated and wherein means are provided for distributing lubricant to the seating surfaces of said valve plug member including a lubricant tube connected to said stem and communicating with grooves in the seating surface of said plug member, said lubricant tube extending radially outwardly from said stem to actuate said limit switch means when said plug member rotates to fully opened and closed positions.

28. The plug valve assembly as defined in claim 25 wherein said control circuit means is provided with first and second relay means for energizing said motor to respectively rotate said stem toward opened and closed positions, and means for electrically interlocking said first and second relay means to prevent both of said relay means from being energized at the same time.

29. The valve assembly as defined in claim 25 wherein said control circuit means includes cam operated contact means for reversing the phasing of said motor.

30. The valve assembly as defined in claim 25 wherein said coupling comprises a rotary driven member operatively connected to said stem, and a driver operatively connected to said armature shaft and freely rotatable for a predetermined magnitude of angular travel relative to said driven member and said stem, said member and said driver having portions engaging each other to restrict the free rotation of said driver to said predetermined magnitude of angular travel so that the momentum developed by said driver during free rotation thereof is imparted to said driven member by impact.

31. The valve assembly as defined in claim 30 wherein said driver is coaxially mounted relative to said bushing member and said driven member and wherein means are provided eliminating the transfer of any unbalanced radial forces to said driven member so that substantially all of the force applied to said driven member is rotary in nature.

32. The valve assembly as defined in claim 30 wherein said driven member is provided with stop means and wherein stop abutments are provided on said body to engage with said stop means and thereby mechanically limit the angular travel of said driven member and said plug member to substantially 90°.

References Cited in the file of this patent
UNITED STATES PATENTS

| | | |
|---|---|---|
| 1,919,525 | Nogosek | July 25, 1933 |
| 1,943,854 | Beckwith | Jan. 16, 1934 |
| 2,551,395 | Rimann | May 1, 1951 |
| 2,855,940 | Milleville | Oct. 14, 1958 |